Patented June 26, 1923.

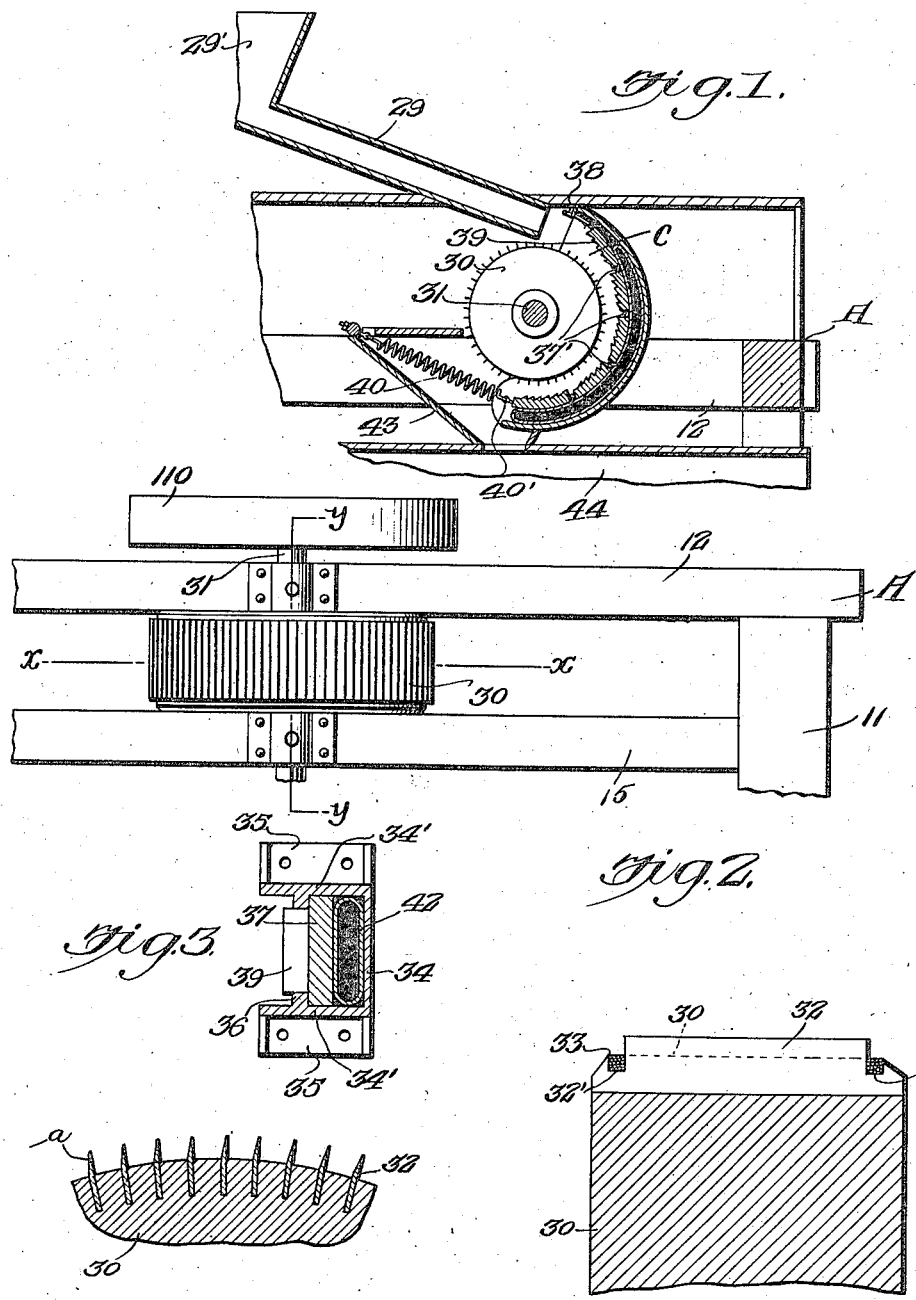

1,460,004

UNITED STATES PATENT OFFICE.

HALL WARREN, OF GALVESTON, TEXAS.

METHOD AND APPARATUS FOR DECORTICATING NUTS.

Original application filed April 12, 1920, Serial No. 373,303. Divided and this application filed July 7, 1920, Serial No. 394,560. Renewed January 12, 1923. Serial No. 519,799.

*To all whom it may concern:*

Be it known that I, HALL WARREN, a citizen of the United States, and a resident of Galveston, in the county of Galveston and State of Texas, have invented certain new and useful Improvements in Methods and Apparatus for Decorticating Nuts, of which the following is a specification.

The present invention relates to methods of and apparatus for decorticating nuts, and is particularly adapted for use with palm or cohune nuts, and constitutes the subject-matter of this application which is a divisional application of my application, Serial Number 373,303, filed April 12, 1920.

The nuts of the palm or cohune varieties embody a kernel or meat which has comparatively high commercial value, because of the high grade oil which it contains. The kernel however is completely, though loosely, encased in a hard shell, and the shell is covered by a husk or outer layer of fibrous structure. Both the shell and the husk are of strong and tough structure, but neither open when the nut is ripe. The difficulties encountered in removing the husk and shell have prevented recovery of the oil on a commercial scale, especially so as it is necessary to effect this removal without injury to the kernel, for the oil contained in the kernel will become rancid if exposed to the air, as when the integument of the kernel is broken.

The object of this invention is to provide for the complete removal of the husk as a step toward rendering the kernel of the nut available for the uses to which it may be put.

In carrying out the invention, there is provided a husker to which the nuts are fed singly and which completely removes the husks and then disassociates the husks from the nuts.

The problem of breaking down or removing the husk without injury to the nut presents special difficulties and necessitates a peculiar treatment of the nuts. In the act, or series of acts, which constitute this treatment resides the method which is to be hereinafter more fully described and particularly pointed out in the appended claims.

Other objects and advantages of the invention reside in the certain novel features of the construction, arrangement and combination of parts as will be hereinafter more fully described and particularly pointed out in the appended claims, reference being had to the accompanying drawings forming a part of this specification, and in which:

Figure 1 is a longitudinal vertical section, taken through the husker and associated structure;

Figure 2 is a plan view of the rotary cutter of the husker;

Figure 3 is a view in transverse section of the relatively stationary cutter or abutment of the husker;

Figure 4 is a fragmentary sectional view of the rotary element of the husker on line $x$—$x$ of Figure 2; and Figure 5 is a similar view on line $y$—$y$ of Figure 2.

The method of decorticating the nuts contemplated by the present invention has for its object the removal of the outer fibrous husk. The removal of the fibrous husk is accomplished by severing the husk structure along lines extending longitudinally of the nut, and simultaneously prying the severed portions radially of the nut and twisting them circumferentially with respect thereto.

The first step, that is, the severing along longitudinal lines is accomplished by a cutting action exerted by blades or knives which penetrate the husk structure. The second step, that is, the prying of the severed portions radially, overlaps or immediately follows the first, and is effected by an outward thrust exerted by a beveled surface formed on the knives or blades. The third and final step consists in twisting the severed portions circumferentially with respect to the nut. This twisting action is brought about by imparting movement of a greater linear velocity to the center of each of the severed portions, then to the ends thereof, this movement being the result of applying a force which acts throughout the circumferential extent of the husk, tending to roll the same. As the central portion of the nut is of greater diameter than the ends, the center will revolve at a greater rate of motion than the ends, and the husk having been cut loose will be twisted circumferentially with respect to the nut.

The improved method will perhaps be better understood by considering it in conjunction with the apparatus which embodies it as a feature.

The apparatus contemplated by my invention consists of a frame designated generally at A. This frame includes columns 11 which upstand from the foundation and carry at their upper ends beams 12 and 15.

The nuts are carried one by one to the hopper 29' of the chute 29 and are delivered singly from the chute 29 to the husker C.

The husker C comprises a rotary cutter in the form of a wheel 30 which is mounted upon one end of the main shaft 31. The rotary cutter comprises a wheel having its periphery slotted transversely to receive the inserted blades or knives 32 as shown in detail in Figures 12 and 13. The ends of the blades 32 are reduced and notched as shown at 32' and a retaining ring or binding of wires 33 serves to retain the blades in position in the slots. It is to be noted that the wheel is notched correspondingly with the blades, and in this manner lateral as well as radial movement is prevented. Each of the blades has formed thereon a beveled wall *a* clearly shown in Figure 3. A relatively stationary cutter or abutment cooperates with the rotary cutter in removing the husks from the nut. This stationary cutter or abutment comprises a housing of segmental form and extending fully approximately 180° and consists of a back wall 34 and side walls 34', the housing adjacent the rotary cutter being open. The side walls 34' carry foot lugs 35, see Figure 3, which are secured by any suitable fastening means to one of the beams 12 and the adjacent intermediate beam 15, whereby the housing is supported in position. Segmental flanges 36 are secured in any suitable manner or may be formed integral with the interior of each of the side walls 34', and these flanges constitute means for limiting the movement of the cutter segments 37 toward the rotary cutter. These cutter segments are linked to each other as shown at 37', the upper one of said segments being pivotally secured to a cross head in the form of an angle iron 38 which is carried by the upper end of the housing. The cross head 38 thus serves to secure the cutter segments against movement in the direction of rotation of the rotary cutter.

As seen in Figure 11, the ends of the cutter segments are reduced and abut against the flanges 36 to limit the radial movement of the segments toward the rotary cutter, while the cutting faces 39 formed on the segments project between the flanges toward the rotary cutter. The lower end of the cutter segments carry a shackle 40' to which is secured a retractile coil spring 40 which resiliently resists the motion of the cutter segments in the direction opposite to the direction of rotation of the rotary cutter. In the space between the back wall of the housing and the rear of the cutter segments, a pneumatic tube 42 is arranged and when inflated, resiliently opposes radial movement of the cutter segments away from the rotary cutter. In place of the pneumatic tube any suitable cushioning means may be provided. When the nuts are delivered from the chute 29, they are received upon the rotary cutter 30 and are carried into engagement with the cutting faces 39 of the stationary cutter. The blades of the rotary cutter and the cutting faces of the stationary cutter then bite into the husks of the nut, and penetrates the same to sever the husk structure along lines extending substantially longitudinally of the nut. As the cutter 30 revolves it rolls the nut about its longitudinal axis with it, and after the husk is severed the beveled surfaces A of the blades 32 pry the severed portions of the husk radially from the nut. Moreover, as both stationary cutter and the rotary cutter engage the nut entirely throughout its longitudinal extent, and as the central portion of the nut is of greater diameter than the ends, the central portion will be revolved with greater velocity than the end portions, thus twisting the severed husk portion and effecting a complete disassociation.

The disassociated husks and nuts are received in the hopper 43 which opens into the flue 44 of a suitable separator (not shown) for segregating the nuts.

The main shaft 31 of the husker is driven by pulley 110 mounted on one end thereof from any suitable source of power, such as a gasoline engine, electric motor or other power plant.

I claim:

1. In an apparatus for decorticating nuts, a husker for removing the outer fibrous layer comprising a rotary cutter and a flexible stationary cutter cooperating with said rotary cutter to effect the removal of the husks consisting of a housing having an open end adjacent the rotary cutter, a plurality of cutter segments linked to each other and disposed in said housing, flanges secured to the side wall of said housing to limit the movement of said cutter segments toward said rotary cutter, a cross head carried by the upper end of said housing and connected to said cutter segments to hold them against movement in the direction of rotation of said cutter, a pneumatic tube for resiliently resisting the movement of said cutter segments away from said rotary cutter, and a retractile coil spring for maintaining said cutter segments against said flanges and resiliently resisting motion of said cutter segments in the direction opposite to the rotation of said rotary cutter, all as and for the purposes set forth.

2. In an apparatus for decorticating nuts, a husker for removing the outer fibrous layer of the nut and disassociating the husk from the nut, comprising a rotary cutter having a plurality of transversely extending blades carried by its periphery, a flexible stationary cutter consisting of a plurality of cutter segments linked to each other and having cutting faces adapted to cooperate with the rotary cutter, means for securing the cutter segments against movement in the direction of rotation of said rotary cutter, means for limiting the rotary movement of said cutter segments toward said rotary cutter, and cushioning means for resiliently resisting the movement of said cutter segments away from said rotary cutter, and spring means for urging said cutter segments against said limiting means and for resiliently resisting the motion of said segments in the direction opposite to the direction of rotation of said rotary cutter, all as and for the purposes set forth.

3. In an apparatus for decorticating nuts, a husker for removing the outer fibrous layer, comprising a cutter, a flexible stationary cutter consisting of a plurality of cutter segments linked to each other and having cutting faces adapted to cooperate with the rotary cutter to effect the removal of said husks, means for securing the cutter segments against movement in the direction of rotation of said rotary cutter, means for limiting the radial movement of said cutter segments toward said cylinder, cushioning means for resiliently resisting the movement of said cutter segments away from said rotary cutter, and spring means for urging said cutter segments against limiting means and for resiliently resisting the motion of said segments in the direction opposite to the direction of rotation of said rotary cutter, all as and for the purposes set forth.

4. In an apparatus for decorticating nuts, a husker for removing the outer fibrous layer, comprising a cutter, a flexible stationary cutter consisting of a plurality of cutter segments linked to each other and having cutting faces adapted to cooperate with the rotary cutter to effect the removal of said husks, means for securing the cutter segments against movement in the direction of rotation of said rotary cutter, cushioning means for resiliently resisting the movement of said cutter segments away from said rotary cutter, and spring means for urging said cutter segments against limiting means and for resiliently resisting the motion of said segments in the direction opposite to the direction of rotation of said rotary cutter, all as and for the purposes set forth.

5. In an apparatus for decorticating nuts, a husker for removing the outer fibrous layer, comprising a cutter, a flexible stationary cutter consisting of a plurality of cutter segments linked to each other and having cutting faces adapted to cooperate with the rotary cutter to effect the removal of said husks, means for securing the cutter segments against movement in the direction of rotation of said rotary cutter, means for limiting the radial movement of said cutter segments toward said cylinder, cushioning means for resiliently resisting the movement of said cutter segments away from said rotary cutter.

6. In an apparatus for decorticating nuts, a husker for removing the outer fibrous layer, comprising a cutter, a flexible stationary cutter consisting of a plurality of cutter segments linked to each other and having cutting faces adapted to cooperate with the rotary cutter to effect the removal of said husks, means for securing the cutter segments against movement in the direction of rotation of said rotary cutter, cushioning means for resiliently resisting the movement of said cutter segments away from said rotary cutter.

7. In an apparatus for decorticating nuts, a husker for removing the outer fibrous layer comprising a rotary cutter, and a flexible abutment to effect removal of the husks consisting of a housing having an open end adjacent the rotary cutter, a plurality of cutter segments linked to each other and disposed in said housing, and a pneumatic tube arranged between said cutter segments and said housing for resiliently resisting the movement of said cutter segments away from said rotary cutter.

8. In an apparatus for decorticating nuts, a husker for removing the outer fibrous layer comprising a rotary cutter and a flexible abutment coacting with said rotary cutter to effect removal of the husks consisting of a housing having an open end adjacent the rotary cutter, a plurality of cutter segments linked to each other and disposed in said housing, flanges secured to said housing to limit the movement of said cutter segments toward said rotary cutter, and cushioning means arranged between said cutter segments and said housing for resiliently resisting the movement of said cutter segments away from said rotary cutter, all as and for the purposes set forth.

9. In an apparatus for decorticating nuts, a husker for removing the outer fibrous layer comprising a rotary cutter and a flexible abutment coacting with the said rotary cutter to effect removal of the husks consisting of a housing having an open end adjacent said rotary cutter, a plurality of cutter segments linked to each other and disposed in said housing, a cross head carried by the upper end of said housing and connected to said cutter segments to hold them against movement in the direction of rotation of said cutter, a pneumatic tube arranged between said cutter sections and said housing for resiliently resisting the movement of said cutter segments away from said rotary cutter, and means for resiliently resisting the motion of said segments in a direction opposite to the direction of the rotation of said rotary cutter, all as and for the purposes set forth.

10. In an apparatus for decorticating nuts, a husker for removing the outer fibrous layer, and a flexible abutment coacting with said rotary cutter to effect the removal of the husks consisting of a housing having an open end adjacent the cutter, a plurality of cutter segments linked to each other and disposed in said housing, flanges secured to the side wall of said housing to limit the movement of said cutter segments toward said rotary cutter, a cross head carried by the upper end of said housing and connected to said cutter segments to hold them against movement in the direction of rotation of said rotary cutter, and a pneumatic tube arranged between said cutter segments and said housing for resiliently resisting the movement of said cutter segments away from said housing.

11. In an apparatus for decorticating nuts, a husker for removing the outer fibrous layer, and a flexible abutment coacting with said rotary cutter to effect the removal of the husks consisting of a housing having an open end adjacent the cutter, a plurality of cutter segments linked to each other and disposed in said housing, flanges secured to the side wall of said housing to limit the movement of said cutter segments toward said rotary cutter, a cross head carried by the upper end of said housing and connected to said cutter segments to hold them against movement in the direction of rotation of said rotary cutter, and a retractile coil spring for maintaining said cutter segments against said flanges and for resiliently resisting motion of said cutter segments away from said flanges, all as and for the purposes set forth.

HALL WARREN.